Patented July 31, 1945

2,380,444

UNITED STATES PATENT OFFICE 2,380,444

CHEMICAL PROCESS AND PRODUCTS

Horace S. Isbell, Washington, D. C., assignor to the Government of the United States, represented by the Secretary of Commerce No Drawing. Application September 4, 1943, Serial No. 501,288

5 Claims. (Cl. 260—484)

(Granted under the act of March 3, 1883, as amended April 30, 1928; 370 O. G. 757)

This invention relates to the manufacture of new chemical compounds and more particularly to the manufacture of crystalline derivatives of galactonic acids.

An object of this invention is to provide new chemical compounds. A more specific object is to provide crystalline derivatives of galactonic acids. Still another object is to provide crystalline esters of galactonic acid. A further object is to provide a simple process for preparing esters of galactonic acids.

The above and other objects hereinafter apparent are accomplished in accordance with the present invention which provides crystalline methyl esters of galactonic acids by subjecting to reaction at a temperature between 20 degrees C. and 100 degrees C. a mixture of methanol and a galactonic compound from the group consisting of L-galactonic acid, D-galactonic acid, and lactones thereof, and recovering an ester of a galactonic acid. It has now been found that the methyl esters of galactonic acids can readily be prepared in accordance with the present invention, and that such esters can be crystallized in a pure state to provide a simple procedure for purifying galactonic acid from crude mixtures containing it.

The invention will be made clear by reference to the following illustrative examples which show how the invention may be carried out, but it is not restricted thereto. Parts are by weight unless otherwise designated and the parts by weight bear the relation to parts by volume that obtains between the gram and the milliliter.

Example 1

Ten parts of D-galactonic acid is admixed, in a glass reaction vessel provided with a reflux condenser, with 200 parts by volume of methanol and 3 parts of hydrogen chloride. The reaction mixture is heated over a steam bath for two hours under atmospheric pressure to the boiling point, a gentle refluxing being maintained. Thereupon, the hydrogen chloride is precipitated by the addition of silver carbonate, and the precipitated silver chloride with excess silver carbonate is removed by filtration from the reaction mixture. The filtrate is subjected to evaporative crystallization by gently heating, and crystalline methyl galactonate separates in a yield approaching quantitative proportions. The crude ester is separated from the mother liquor by filtration, and recrystallized from acetone. The recrystallization is hastened by adding ligroin to the acetone solution. The product corresponds to the formula, $C_7H_{14}O_7$, and has a melting point of 156 degrees C. In 4 percent aqueous solution, the specific rotation of the product is $-11°$.

Example 2

In the apparatus of Example 1, ten parts of L-galactonic gamma-lactone are suspended in 50 parts by volume of methanol and 0.2 parts of phosphoric anhydride is added. In the course of a few hours crystalline methyl L-galactonate separates from the solution. The crystals are collected on a filter, washed with a mixture of methanol and ether, and then dried. The material is recrystallized, conveniently, by dissolving it in methanol and adding ether to the saturated solution.

The new compound exhibits a melting point of $156°$ C. and a specific rotation of $-11°$, in 4% aqueous solution. By analysis, the formula corresponds to $C_7H_{14}O_7$.

Example 3

Twenty parts of galactonic gamma-lactone are heated at $50°$ C. with 75 parts of anhydrous methanol and 1 part of dimethyl sulfate, in a glass reaction vessel, provided with means for excluding atmospheric moisture. In the course of several hours, methyl galactonate crystallizes from solution. The crystals are separated from the mother liquor by filtration and purified as described under Example 2. The mother liquor is heated with additional galactonic gamma-lactone and methyl alcohol, for the preparation of additional ester. The crystals are separated and the cycle can be repeated.

It will be apparent from the foregoing description and examples that new crystalline compounds of both D-galactonic acid and L-galactonic acid have been provided. They can be prepared by the esterification of the D- or L- acids and lactones with equal facility. They readily separate as distinct crystalline entities, and are easily purified. Thus, the invention provides a very desirable esterification method for purifying galactonic acid from crude mixtures containing it, and the ester which is prepared can readily be hydrolized in the presence of excess water to liberate again the pure galactonic acids.

Since many apparently widely differing embodiments of the invention will occur to one skilled in the art, various changes can be made in the invention without departing from the spirit and scope thereof.

The invention described herein may be made and used by and for the Government of the United States without payment to me of any royalty therefor.

What is claimed is:

1. A crystalline mono-methyl ester of a galactonic acid.
2. Crystalline mono-methyl D-galactonic ester.
3. Crystalline mono-methyl L-galactonic ester.
4. A process for the preparation of a galactonic ester which comprises subjecting to reaction in the presence of an esterification catalyst a mixture of methanol and a galactonic compound from the group of L-galactonic acid, D-galactonic acid, and lactones thereof, and recovering a crystalline ester of galactonic acid.
5. In a process for the production of a purified galactonic compound from crude mixtures containing the same, the steps which comprise treating a crude mixture containing a compound from the group of galactonic acids and their lactones with methanol and an esterification catalyst, then crystallizing and separating a relatively pure monomethyl galactonic ester from the impurity-containing solution.

HORACE S. ISBELL.